T. EDWARDS.
PRECIPITATION APPARATUS.
APPLICATION FILED FEB. 15, 1910.

967,744.

Patented Aug. 16, 1910.

UNITED STATES PATENT OFFICE.

THOMAS EDWARDS, OF BALLARAT, VICTORIA, AUSTRALIA.

PRECIPITATION APPARATUS.

967,744.

Specification of Letters Patent. Patented Aug. 16, 1910.

Application filed February 15, 1910. Serial No. 544,067.

*To all whom it may concern:*

Be it known that I, THOMAS EDWARDS, a subject of the King of Great Britain and Ireland, &c., residing at Ballarat, in the State of Victoria, Commonwealth of Australia, have invented certain new and useful Improvements in Precipitation Apparatus; and I do hereby declare the following to be a full, clear, and exact description of the invention, such as will enable others skilled in the art to which it appertains to make and use the same.

This invention relates to the precipitation of precious metal from solution used in cyaniding or in chlorination.

Time is of much importance in precipitation operations when large quantities of material must be dealt with; and charcoal precipitation plant should neither take up so much room, nor cost so much initially, nor need such considerable handling as the plant heretofore used, for it is often only then that the pregnant solution can be profitably treated by charcoal precipitation.

I find that I secure precipitation on charcoal by my invention without incurring the objections above quoted.

Instead of my process being slow it is rapid; instead of being cumbersome and costly it is convenient and cheap, and thus contrasts with the use of charcoal referred to in his work on *Cyanide Practice* (3rd edition) by Alfred James, a cyanid expert, who says: "In Victoria a number of cyanid plants have been equipped with charcoal tubs . . . This method appears clumsy and troublesome . . . appears more than twice as expensive . . . as the zinc process, and the initial expense of the installation is at least four times as great." Professor Park, an expert referring to the use of charcoal for precipitation, states: "The process is too slow and cumbersome to recommend itself in large plants where hundreds of tons of solution have to be handled in the twenty four hours."

I provide compartmented precipitation troughs or boxes (discarding the old independent tubs) with charcoal, and solution in regulated motion, and in addition I force through the solution air, or gaseous fluid having a like effect.

Figure 1:
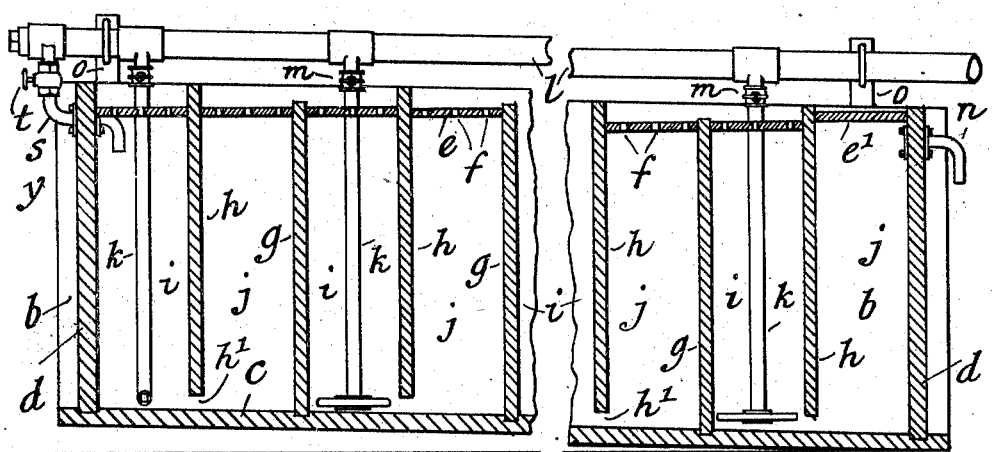
Figure 2:
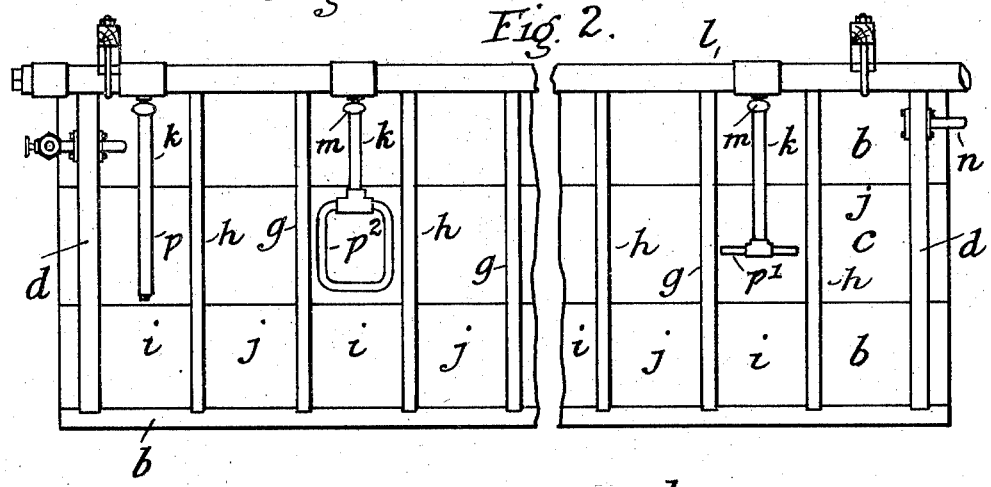
Figure 3:
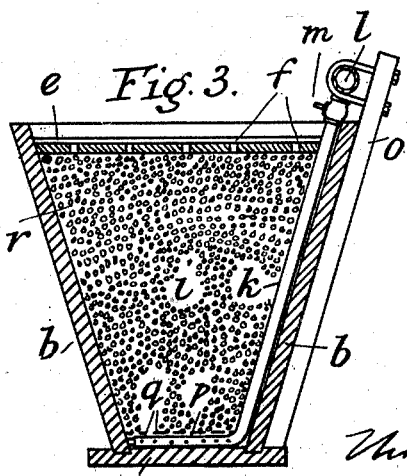

The accompanying drawings illustrate a simple form of plant I may employ.
Figure 1 is a side elevation in vertical section. Fig. 2 is a plan view, and Fig. 3 an end view in transverse section.

$a$ represents any floor or support of a precipitation box or trough of wood or other known suitable material of suitable form, that shown having its base $c$ narrower than its top; $b$ are sides, and $d$ ends. A series of partitions $h$, $g$, divide the trough into a series of compartments $i$, which alternate with several compartments $j$. All compartments are provided with suitable covers as $e$ having perforations or openings as $f$, or means to allow of the passage of solution and the escape of air. Means are provided to allow of the flow of solution from one end of the trough which receives the solution to be treated to the other end past the various partitions. Thus $y$ the trough feed end is raised and the respective partitions $h$ have gaps $h^1$ under them or openings at their bases so that the liquor can flow through. Partitions $g$ allow the liquid to flow over them or through their tops. The effect is to cause the liquor to flow repeatedly down and up or from compartment to compartment until it is discharged as by one or more pipes $n$, when it may be barren. If not so, it can be further treated. It is not essential that the troughs be straight as they may have circular or other suitable forms. I regulate the supply, which is through any pipe or feed as $s$ having a regulated cock or tap as $t$, reducing it until the effluent is found to be barren, or as nearly so as is deemed satisfactory.

The number of box or trough compartments or chambers may vary, a dozen having in practice been satisfactory. The entire box is arranged in some cases so that the whole of its charcoal and contents can be tipped into a chute or receiver, and liquid drained from it being reused as desired.

I bring the liquid into contact with enough charcoal $r$ (inserted in small pieces) or granulated sufficiently to present a large surface to the solution, to enable the precipitation to be effected as desired. Porous wood charcoal in pieces approximating half an inch in diameter answers well, but my invention is not limited thereto. After the charcoal is filled into the compartments the wooden or other covers are put on, so arranged as to permit liquid and air to rise through or pass them while keeping floating charcoal from escaping. Any suitable locking devices for the covers, and for safeguarding other parts are usable at will, these not needing illustration.

Aeration is secured by means of any piping or main $l$ from which branches $k$ extend down into some or all of the precipitation compartments, alternate ones being sufficient. The foot of each pipe $k$ is an extension in any suitable direction along each compartment base transversely to the trough as at $p$,—or, as at $p^1$, longitudinally of the trough,—or ringwise as at $p^2$, or otherwise suitably. Each foot as $p$, $p^1$ or $p^2$ is suitably perforated as at $q$, so that air forced through pipes $k$, under regulation as by cocks or valves as $m$, will emerge through the perforations into the compartments, and rise through the same. The aeration is beneficial in promoting precipitation from the cyanid or chlorin liquor. Cyanid or chlorin liquor containing precious metal is fed in from time to time, or continuously during the air feed; and will travel or rise past the covers, and pass to each succeeding compartment in turn, it being tested at will for precious metal. If the liquor is found to be sufficiently relieved of its precious metal as it discharges at $n$, I may then further treat it for recovery of values as of copper, if it contains sufficient thereof, but that is beyond this invention. Precious metal, as metallic gold, deposits on, and in the charcoal which when well loaded therewith is burned, as is well understood, to recover the gold as bar gold.

I may provide removable gratings or cages in the compartments for expeditiously and comprehensively handling the charcoal, and the covers may also be gratings, one to each or one to a series of compartments: the end cover $e^1$ is shown without holes.

Any suitable blower, or fan, or power will be used for forcing air or the like through the liquid.

In this specification the word "charcoal" includes any equally suitable carbonaceous preparation.

Instead of forcing air into alternate compartments, as shown on the drawing, it may be forced into each compartment or into such compartments as is found necessary. Aeration in compartments as $i$ will promote the deposition not only therein, but also in other compartments $j$.

What I claim as my invention and desire to secure by Letters Patent of the United States is:—

1. In a precipitation apparatus the combination of a tank divided into chambers and provided with partitions so arranged as to cause an alternate downward and upward flow of the liquid under treatment in said chambers, said chambers being adapted to be filled with charcoal, means for supplying the liquid to be treated to said tank at one end, outlet means at the other end of said tank, and means for forcing air into some of said chambers, substantially as described.

2. In a precipitation apparatus the combination of a tank provided with partitions extending upwardly from the bottom thereof dividing said tank into chambers, a perforated cover for said tank, partitions extending through said cover toward the bottom of said tank, said tank being thus divided into chambers so arranged that the liquid under treatment is caused to flow alternately downwardly and upwardly, inlet and outlet means for said tank, and means for forcing air into some of said chambers, substantially as described.

3. In a precipitation apparatus the combination of a tank having a compartment and upwardly flaring sides and partitions extending upwardly from said bottom dividing the tank into a series of chambers, a perforated cover for said tank, intermediate partitions passing through said cover but stopping short of the bottom of said tank, inlet and outlet pipes for the liquid to be treated, and means for forcing air into some of said chambers, substantially as described.

4. In a precipitation apparatus the combination of a tank having a bottom and upwardly extending flaring sides and provided with a perforated cover and partitions extending upwardly from said bottom through said cover, an intermediate series of partitions extending downwardly through said cover but stopping short of the bottom of said tank, inlet and outlet pipes for said tank, and means for forcing air into some of said chambers including an open main branch, pipes connected to said open main and extending down into the bottom of said chambers and perforated at their lower ends, said chambers being adapted to be filled with charcoal, substantially as described.

In witness whereof I have hereunto set my hand in the presence of two witnesses.

THOMAS EDWARDS.

Witnesses:
GEORGE GARIBALDI TURRI,
BEATRICE M. LOWE.